UNITED STATES PATENT OFFICE.

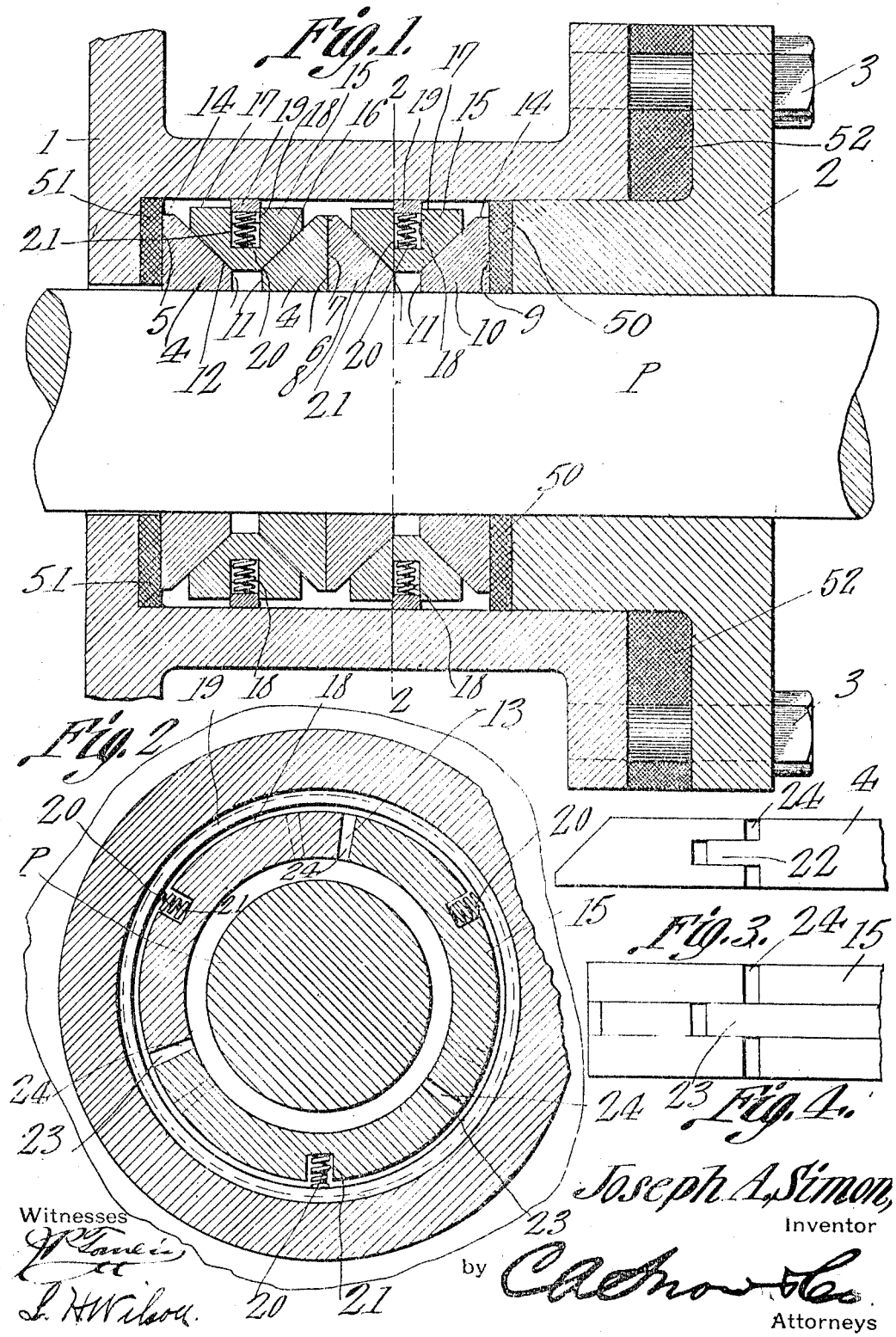

JOSEPH A. SIMON, OF MEMPHIS, TENNESSEE.

METALLIC PACKING.

1,020,456.  Specification of Letters Patent.  Patented Mar. 19, 1912.

Application filed June 20, 1911. Serial No. 634,349.

*To all whom it may concern:*

Be it known that I, JOSEPH A. SIMON, a citizen of the United States, residing at Memphis, in the county of Shelby and State of Tennessee, have invented a new and useful Metallic Packing, of which the following is a specification.

It is the object of this invention to provide a metallic packing for the piston rods of steam engines, air-pumps and the like, which packing will engage the piston rod closely, and prevent a leakage about the same.

A further object of the invention is to provide a series of segmental rings adapted to inclose the piston rod, to provide a packing adapted to engage with the cylinder structure, and to interpose between the packing and the rings, a wedge shaped ring, effective at once, to crowd the packing against the cylinder structure, and to compact the first named rings about the rod.

A further object of the invention is to provide novel means for maintaining the packing in place in the wedge shaped ring which actuates the segmental, rod-inclosing rings.

A further object of the invention is to provide a packing for a piston rod, which packing will readily take up wear.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in longitudinal section; Fig. 2 is a transverse section on the line 2—2 of Fig. 1; Fig. 3 is a fragmental side elevation of one of the primary rings; and Fig. 4 is a fragmental edge elevation of one of the secondary rings.

In the accompanying drawings, the numeral 1 denotes generally, a stuffing box, within which fits, as usual, the packing gland 2, the latter being retained in place by a bolt and nut structure 3, as is well understood.

Surrounding the piston rod P, and located within the stuffing box 1, are primary rings 4, having parallel end walls 5 and 6, the end wall 5 of one ring 4 abutting against a ring 51 of asbestos or the like, the ring 51 abutting against the end of the stuffing box 1, the end wall 6 of the other ring 4 abutting against the corresponding end wall 7 of another primary ring 8, the end wall 9 of the other primary ring 10 abutting against a ring 50 of asbestos or other suitable material, the ring 50, in its turn abutting against the end wall of the packing gland 2, a ring 52 of like material being located between the parts 1 and 2 to act as a gasket. As denoted by the numeral 11, the adjacent end walls of the packing rings 4, and of the rings 8 and 10, are parallel, and are spaced apart. The outer faces of the primary rings are beveled inwardly, as shown at 12. The peripheries of the primary rings, beyond the beveled faces 12, are disposed in a common plane, and are parallel to and spaced from, the inner face of the stuffing box 1, as shown at 14.

The invention further includes secondary rings 15 which, in cross section, are wedge-shaped, the beveled faces 16 of the secondary rings 15 engaging with the faces 12 of the primary rings. The outer, peripheral walls of the rings 15 are spaced from the inner face of the stuffing box 1, as shown at 17. The rings 15 are circumscribed, in their faces 17, by grooves 18, in which are located packing rings 19, adapted to engage with the stuffing box 1. The rings 19 are actuated outwardly by helical compression springs 20, the inner ends of which are disposed in spaced seats 21, formed in the bases of the grooves 18.

It is of course to be understood that all of the primary and secondary rings are segmental structures, as must be necessary, in order that they may expand, and contract about the piston rod P. The manner of assembling the sections of the segmental rings, may be varied, as may be desired. For instance, as is shown, the primary rings may be tongue and grooved together, terminally, as shown at 22; the secondary rings being tongue and grooved together, terminally as shown at 23; although these tongue and groove arrangements are not obligatory. The component sections of the primary and secondary rings are spaced apart, as shown at 24, to provide for the expansion and contraction thereof.

It will be seen that when the nuts 3 are tightened, the packing gland 2 will be thrust into the stuffing box 1, pressing the primary rings 4, 8 and 10 together, longitudinally of the piston rod P. The secondary rings 15 will be thrust outwardly, putting the springs 20 under compression, which springs will serve to actuate the packings 19 outwardly, to engage with the stuffing box 1, these springs 20, at the same time serving to thrust the primary rings 4, 8 and 10 inwardly, to compress the same and inclose the piston rod P closely.

Owing to the fact that the packing rings 19 are engaged in the grooves 18, these packing rings will be held assembled with the secondary rings 15. Since the adjacent ends of the primary rings are spaced apart, as indicated at 11, and since the peripheries of these rings are spaced from the inner face of the stuffing box 1, and since, moreover, the outer peripheries 17 of the secondary rings 15 are spaced from the stuffing box 1, any wear incident to the reciprocation of the piston rod P may readily be taken up, without causing any portions of the packing structure to bind, either against each other or against the stuffing box upon the one hand, and the piston rod upon the other.

The primary and secondary rings are preferably fashioned from Babbitt or like metal, and may be renewed at a trifling cost.

The construction of the device is such that no alteration in the form of the cylinder head or of the packing gland is necessary, the device forming the subject matter of this application being adapted for use in connection with all standard forms of glands.

Having thus described the invention, what is claimed is:—

1. The combination with a gland, a stuffing box and a sliding rod, of rings abutting against the gland and against the end of the stuffing box, the rings each being of equal thickness throughout, and being fashioned from refractory, heat-insulating material; pentagonal, wedge-shaped primary rings, the bases of all of the primary rings being disposed toward the rod, one pair of primary rings being disposed back to back, and another pair of primary rings being disposed with their backs against the refractory rings, whereby the wedge faces of the pairs of rings will be positioned opposite each other to define grooves; hexagonal, wedge-shaped secondary rings seated in the grooves; the secondary rings being equipped with peripheral grooves having depressed seats; packings located in the peripheral grooves of the secondary rings; and springs located in the seats, and bearing against the packings, to actuate the packing outwardly against the stuffing box.

2. The combination with a gland, a stuffing box, and a sliding rod, of pentagonal, wedge-shaped primary rings, the bases of all of the primary rings being disposed toward the rod, one pair of primary rings being disposed back to back, and another pair of primary rings being disposed with their backs toward the gland and toward the end of the stuffing box, respectively, whereby the wedge faces of the pairs of rings will be positioned opposite each other, to define grooves; hexagonal, wedge-shaped secondary rings seated in the grooves; and spring means for advancing the secondary rings against the primary rings.

3. The combination with a gland, a stuffing box, and a sliding rod, of primary, wedge-shaped rings, the bases of all of the rings being disposed toward the rod, one pair of primary rings being disposed back to back, and another pair of primary rings being disposed with their backs toward the gland and toward the end of the stuffing box, respectively, whereby the wedge faces of the pairs of rings will be positioned opposite each other, to define grooves; wedge-shaped secondary rings seated in the grooves; and refractory rings interposed between the last named pair of primary rings and the gland and the end of the stuffing box, respectively.

In testimony that I claim the foregoing as my own, I have hereto affixed my signature in the presence of two witnesses.

JOSEPH A. SIMON.

Witnesses:
A. THOMAS,
GEO. E. TAYLOR.